US008931792B1

(12) United States Patent
Klassen

(10) Patent No.: US 8,931,792 B1
(45) Date of Patent: Jan. 13, 2015

(54) FOLDING VEHICLE STAIRCASE

(71) Applicant: Frank Klassen, West Lorne (CA)

(72) Inventor: Frank Klassen, West Lorne (CA)

(*) Notice: Subject to any disclaimer, the term of this patent is extended or adjusted under 35 U.S.C. 154(b) by 0 days.

(21) Appl. No.: 14/102,599

(22) Filed: Dec. 11, 2013

(51) Int. Cl.
*B60R 3/02* (2006.01)

(52) U.S. Cl.
CPC .......................... *B60R 3/02* (2013.01)
USPC ......... 280/166; 182/65.1; 182/67.1; 182/67.4

(58) Field of Classification Search
USPC ............... 280/163, 166; 182/65.1, 67.1, 67.4, 182/68.1
See application file for complete search history.

(56) References Cited

U.S. PATENT DOCUMENTS

| | | | | | |
|---|---|---|---|---|---|
| 2,642,217 | A | * | 6/1953 | Jennings | 182/88 |
| 3,392,990 | A | * | 7/1968 | Wolf | 280/163 |
| 4,139,078 | A | * | 2/1979 | Keller | 182/88 |
| 4,245,716 | A | * | 1/1981 | Rayfield | 182/86 |
| 4,424,751 | A | | 1/1984 | Blochlinger | |
| 4,669,574 | A | | 6/1987 | Moutot | |
| 4,720,116 | A | | 1/1988 | Williams et al. | |
| 4,874,197 | A | * | 10/1989 | Grable | 296/162 |
| 5,026,243 | A | * | 6/1991 | Dell | 414/401 |
| 5,033,582 | A | * | 7/1991 | Hoben | 182/85 |
| 5,039,119 | A | * | 8/1991 | Baughman | 280/166 |
| 5,046,582 | A | * | 9/1991 | Albrecht | 182/127 |
| 5,064,023 | A | * | 11/1991 | Loeber | 182/90 |
| 5,154,125 | A | | 10/1992 | Renner et al. | |
| 5,199,731 | A | * | 4/1993 | Martin | 280/166 |
| 5,205,603 | A | | 4/1993 | Burdette, Jr. | |
| 5,228,707 | A | | 7/1993 | Yoder | |
| 5,397,143 | A | * | 3/1995 | Bird | 280/166 |
| 5,941,342 | A | | 8/1999 | Lee | |
| 5,996,737 | A | * | 12/1999 | Hedley et al. | 182/127 |
| 6,003,633 | A | * | 12/1999 | Rolson | 182/127 |
| 6,029,775 | A | * | 2/2000 | Hedley et al. | 182/127 |
| 6,173,812 | B1 | * | 1/2001 | Spivey et al. | 182/88 |
| 6,942,271 | B1 | | 9/2005 | Jamison et al. | |
| 7,080,713 | B1 | | 7/2006 | Riggs | |
| 7,354,050 | B2 | * | 4/2008 | Brockway | 280/66 |
| 7,401,798 | B2 | * | 7/2008 | Dolan | 280/163 |
| 7,753,171 | B2 | * | 7/2010 | Castagno et al. | 182/127 |
| 7,870,932 | B2 | * | 1/2011 | Lapke et al. | 182/127 |
| 7,905,324 | B2 | * | 3/2011 | Gil et al. | 182/127 |
| 8,186,763 | B2 | * | 5/2012 | Kramer et al. | 299/39.4 |
| 8,322,490 | B1 | * | 12/2012 | Loemker | 182/127 |
| 8,376,084 | B2 | * | 2/2013 | Castagno et al. | 182/84 |

(Continued)

FOREIGN PATENT DOCUMENTS

CA 2100964 1/1994
EP 0197 873 A2 10/1986

(Continued)

*Primary Examiner* — Jeffrey J Restifo
(74) *Attorney, Agent, or Firm* — Kagan Binder, PLLC

(57) ABSTRACT

A staircase for a vehicle with a rigid frame attached to a rigid bed connector that is attachable to the bed of a vehicle. The bed connector is pivotably attachable to the bed so that the connector can be rotated between a stowed position in which the connector is above the bed and a deployed position in which the connector extends behind the vehicle bed. The frame is rotatably attached to the bed connector so the frame is rotatable between a deployed position in which an end of the frame rests on the ground and a retracted position in which the frame is parallel to the bed. The bed connector is then rotatable to bring the staircase to stowed position above the vehicle bed. A plurality of steps are attached to the staircase frame so that a user can walk up the stairs and onto the vehicle bed.

17 Claims, 8 Drawing Sheets

(56) References Cited

U.S. PATENT DOCUMENTS

| | | |
|---|---|---|
| 8,668,216 B2 * | 3/2014 | Ellement ................. 280/166 |
| 2006/0272895 A1 | 12/2006 | Lavoie |
| 2009/0038885 A1 | 2/2009 | Ellement |
| 2009/0065301 A1 * | 3/2009 | Ellement ................. 182/127 |
| 2010/0025955 A1 | 2/2010 | Carr, Jr. |
| 2010/0230209 A1 | 9/2010 | Hughes et al. |
| 2011/0140389 A1 * | 6/2011 | Ellement ................. 280/166 |
| 2013/0187354 A1 * | 7/2013 | Venkataraman ........ 280/166 |
| 2013/0193666 A1 | 8/2013 | Kibler |
| 2013/0193667 A1 * | 8/2013 | Ellement ................. 280/166 |

FOREIGN PATENT DOCUMENTS

| | | |
|---|---|---|
| EP | 0197873 A3 | 10/1986 |
| GB | 2455333 | 6/2009 |

* cited by examiner

FOLDING VEHICLE STAIRCASE

FIELD OF THE INVENTION

The present invention relates generally to equipment for improving access to a vehicle, and more particularly to deployable staircases for vehicles.

BACKGROUND OF THE INVENTION

Vehicles, such as trucks, are frequently used to transport goods. Such vehicles often have a flat bed that is several feet above the ground which is designed to facilitate loading and unloading the vehicle from a loading dock positioned at the height of the bed. However, in many cases it is desirable to be able to unload/load contents of the vehicle to/from the ground, which is several feet below the bed. Retractable ramps or stairs may be used for this purpose, but such ramps and stairs that have been disclosed extend rearward from the vehicle, thus requiring a substantial amount of clearance behind the vehicle, which is often not available.

SUMMARY OF THE INVENTION

The following presents a simplified summary of the disclosure in order to provide a basic understanding to the reader. This summary is not an extensive overview of the disclosure and it does not necessarily identify key/critical elements of the invention or delineate the scope of the invention. Its sole purpose is to present some concepts disclosed herein in a simplified form as a prelude to the more detailed description that is presented later.

The present invention provides a staircase for a vehicle having two sides and a flat bed having a rear end. The staircase includes a rigid staircase frame having proximal and distal ends, a rigid bed connector, and a plurality of steps attached to the staircase frame. The bed connector is attached to the staircase frame near the proximal end of the staircase frame. The bed connector is pivotably attachable to the vehicle bed so that the bed connector is rotatable between a stowed position in which all portions of the bed connector are above the vehicle bed and a deployed position in which a portion of the bed connector extends outward from the rear end of the vehicle bed. Preferably the extending portion is substantially perpendicular to the rear end of, vehicle bed and at the same height as, the bed. The staircase frame is rotatably attached to the bed connector so that when the bed connector is in the deployed position the staircase frame is rotatable between a deployed position in which the distal end of the staircase frame rests on the ground and a retracted position in which the staircase frame is substantially parallel to the vehicle bed. When the staircase frame is in the retracted position and the bed connector is in the deployed position, and the bed connector is then rotated to the stowed position while the position of the staircase frame relative to the bed connector is held fixed, the staircase is then in a first stowed position in which all portions of the staircase are above the vehicle bed. The plurality of steps are attached to the staircase frame so that when the bed connector and staircase frame are in the deployed position, the steps are substantially parallel to the ground (and vehicle bed) and a user can walk up the stairs and onto the vehicle bed.

When the bed connector and staircase frame are each in the deployed position, each of the steps may be approximately the same distance from a notional vertical plane passing through the rear end of the vehicle bed.

The bed connector may be attached to the vehicle bed near one side of the vehicle, and no portion of the staircase may extend beyond either side of the vehicle when the bed connector and staircase frame are each in the deployed position or in a stowed position.

When the bed connector is in the deployed position, no portion of the staircase may be more than one meter behind the notional vertical plane passing through the rear end of the vehicle bed.

When the staircase is in the first stowed position, the staircase frame and steps may be substantially perpendicular to the vehicle bed, the "staircase frame" in this context referring to a notional plane through both rails of the frame.

The bed connector may be attached to the vehicle bed near one side of the vehicle, and when the bed connector is in the stowed position, the staircase frame may be rotatable about the bed connector between the first stowed position and a second stowed position in which all portions of the staircase frame are proximate to one of the inner sides of the vehicle.

The staircase may also include a railing attached to the staircase frame. The railing may be movable between a deployed position and a stowed (or folded) position so that when the staircase is in the first stowed position, and the railing is in the stowed position, no portion of the railing is more than 50 centimeters from the staircase frame.

When the bed connector, staircase frame and railing are each in the deployed position, the railing may be lockable in the deployed position.

The invention further provides a staircase for a vehicle having a flat bed having a rear end, the staircase including a rigid shelf having a substantially flat upper surface, a bed connector attached to the shelf, a rigid staircase frame pivotably attached to the shelf, and a plurality of steps attached to the staircase frame. The bed connector is attached to the shelf for pivotable attachment to the vehicle bed so that the bed connector and shelf are rotatable between a deployed position in which the shelf extends out from the rear end of the vehicle bed so that the flat upper surface of the shelf is substantially parallel to the vehicle bed, and a stowed position in which all portions of the shelf and bed connector are above the vehicle bed. The rigid staircase frame is pivotably attached to the shelf and rotatable between a retracted position, in which the staircase frame is above the vehicle bed when the shelf is in the stowed position, and a deployed position such that when the bed connector, shelf and staircase frame are each in the deployed position an end of the staircase frame (such as two feet of the two rails of the frame) rests on the ground. The plurality of steps are attached to the staircase frame so that when the bed connector, shelf and staircase frame are each in the deployed position, the steps are substantially parallel to the ground and a user can walk up the stairs onto the shelf and onto the vehicle bed.

When the shelf is in the deployed position, the flat upper surface of the shelf may be at substantially the same height as the rear end of the vehicle bed and the shelf may abut the rear end of the vehicle bed.

When the bed connector, shelf and staircase frame are each in the deployed position, (the corresponding portions of) each of the steps may be approximately the same distance from a notional vertical plane passing through the rear end of the vehicle bed.

When the bed connector, shelf and staircase frame are each in the deployed position no portion of the staircase may be more than one meter away from the rear end of the vehicle bed.

When the staircase frame is in the retracted position the staircase frame may be substantially parallel to the shelf.

When the bed connector, shelf and staircase frame are each in the stowed position the shelf and staircase frame may be substantially perpendicular to the vehicle bed.

The bed connector may be attached to the vehicle bed near one side of the vehicle, and when the bed connector, shelf and staircase frame are each in the stowed position, the shelf and staircase frame may be rotatable about the bed connector so that the shelf and staircase frame may be rotated between a position in which the shelf and staircase frame are substantially parallel to the rear end of the vehicle bed, and a position in which the shelf and all portions of staircase frame are proximate to an inner side of the vehicle The staircase may also include a railing attached to outer portions of the shelf and staircase frame. The railing may be movable between a deployed position and a stowed (or folded) position so that when the bed connector, shelf and staircase frame are each in the stowed position, and the railing is in the stowed position, no portion of the railing may be more than 50 centimeters from the staircase frame.

When the bed connector, shelf, staircase frame and railing are each in the deployed position, the railing may be lockable in the deployed position.

The invention also provides a retractable entry system for a vehicle having a flat bed having a rear end, the system including a rigid ramp having proximal and distal ends and a rigid bed connector attached to the ramp near the proximal end. The bed connector is pivotably attachable to the vehicle bed so that the bed connector is rotatable between a stowed position in which all portions of the bed connector are above the vehicle bed and a deployed position in which the bed connector extends outward from (perpendicular to) the rear end of the vehicle bed, the ramp being rotatably attached to the bed connector so that when the bed connector is in the deployed position the ramp is rotatable between a deployed position in which the distal end of the ramp rests on the ground and a retracted position in which the ramp is substantially parallel to the vehicle bed, and wherein, when the ramp is in the retracted position and the bed connector is in the deployed position, and the bed connector is then rotated to the stowed position while the position of the ramp relative to the bed connector is held fixed, all portions of the retractable entry system are then above the vehicle bed.

Figure 1:
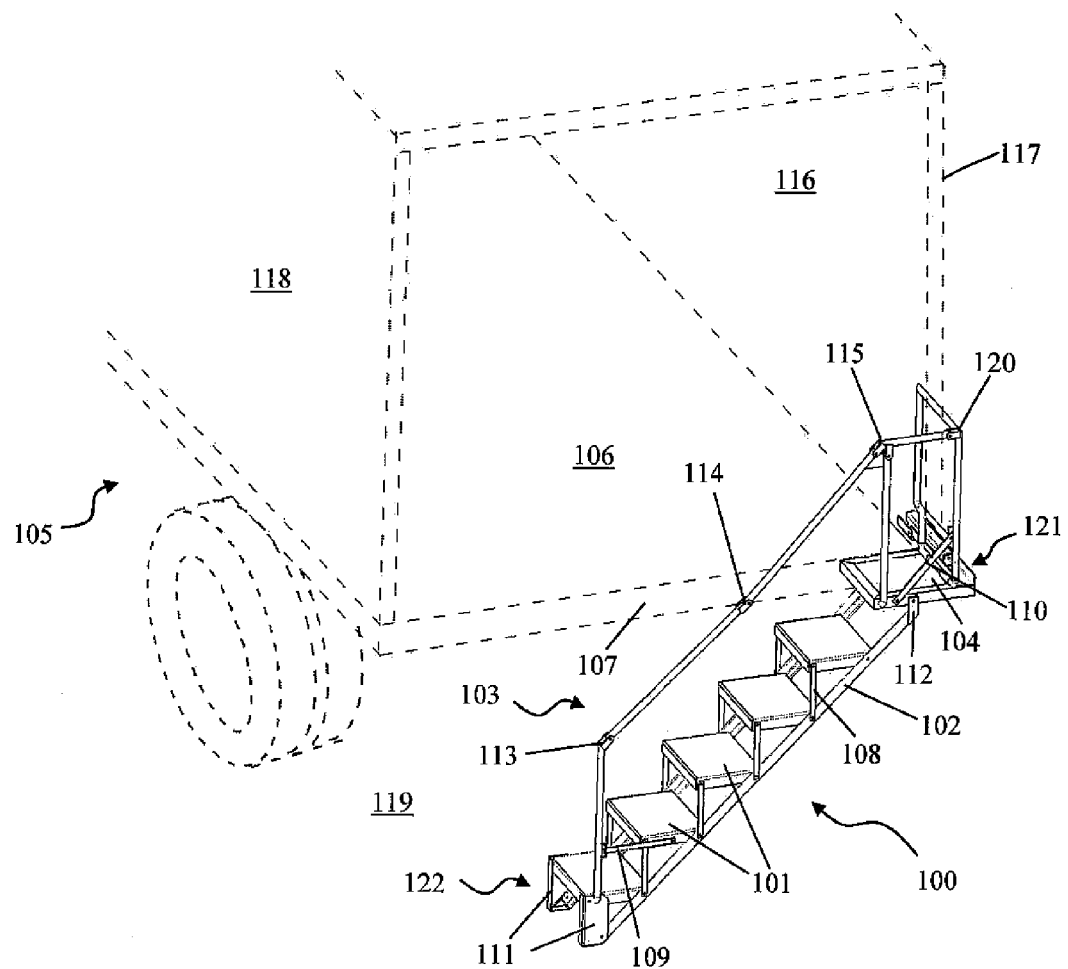
FIG. 1 is a perspective view of a vehicle staircase in the deployed or operating position as seen from the rear of the vehicle, which is a truck.

In the drawings, portions of the vehicle, which is a truck, which are not part of the invention are indicated using stippled lines.

DETAILED DESCRIPTION OF THE INVENTION

FIG. 1 depicts a preferred embodiment of the foldable vehicle staircase 100 in the deployed position behind a vehicle which is a truck 105 having a flat bed 106. The staircase 100 extends from a proximal end 121, where it attaches to the truck 105, to a distal end 122, where the feet 111 of the staircase 100 rest on the ground 119. The staircase 100 has a rigid shelf 104 which, in the deployed position, is substantially parallel to, and preferably at the same height as, the truck bed 106, extending outward from the truck bed 106 to form a shelf that a human user can stand on.

In this description, the directions left and right are referenced to the direction that the truck 105 faces so that side 117 is the right side and side 118 is the left side. While the figures show the proximal end 121 of the staircase 100 being attached to bed 106 near the right wall 116 of the truck 105 with the distal end 122 of the staircase 100 resting on the ground 119 towards the left side of the truck 105, this could of course be reversed. The terms front and rear are also used relative to the truck.

The staircase 100 has a frame 102 comprising two rails that are pivotably connected to the shelf 104 at the proximal end of the frame 102 by frame connectors 112, and which extend straight from the shelf 104 to the feet 111 of the staircase. A front rail (towards the front of the truck 105) is proximate to the rear end 107 of the truck 105 at the top of the rail, and a rear rail is parallel to the front rail, spaced away from the front rail in the rearward direction by a distance corresponding approximately to the width of the steps 101. The front rail is proximate to a notional vertical plane passing through the rear end 107 of the truck 105 that is perpendicular to the truck bed 106 and to the ground 119. All points along the rear rail are approximately equidistant from the notional truck rear end plane.

Figure 3:
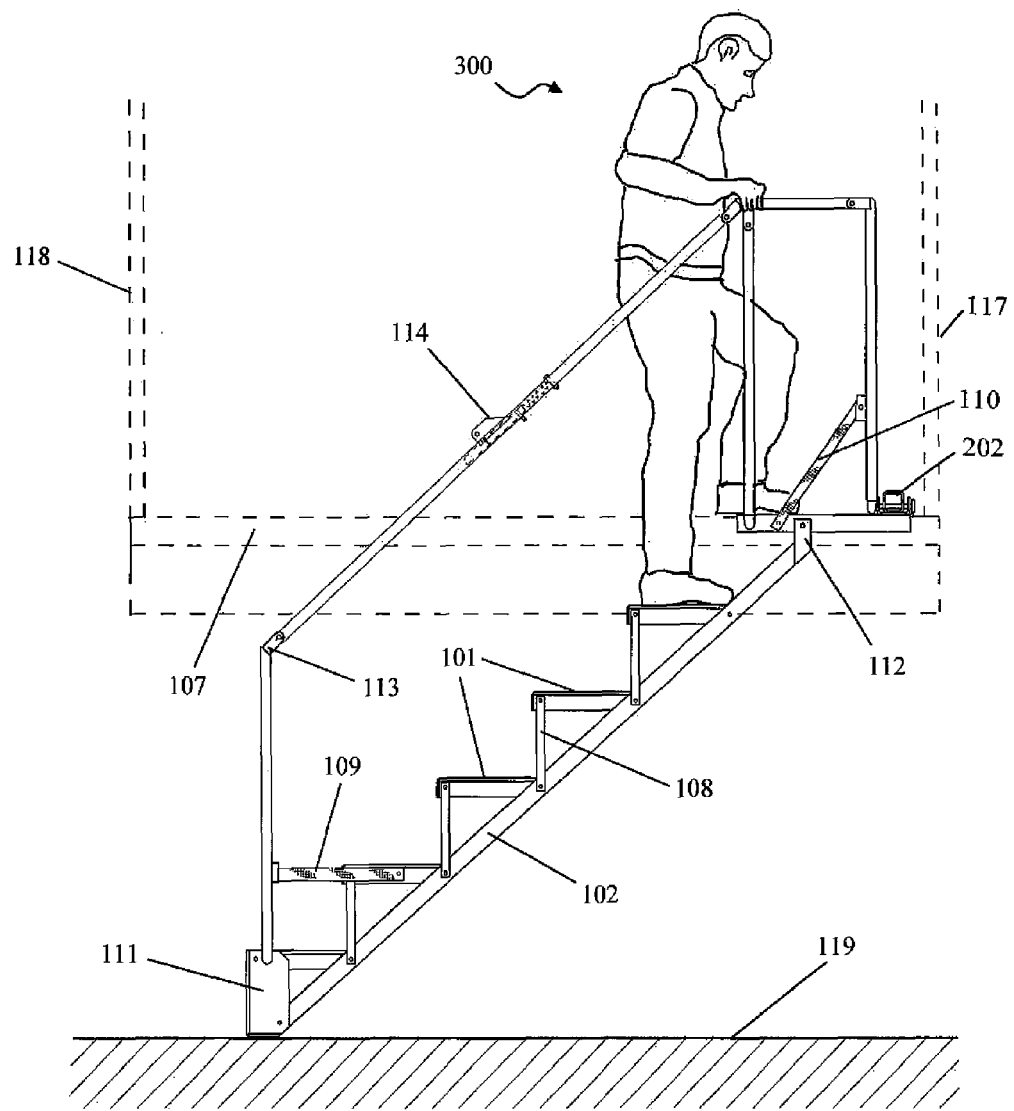
FIG. 3 is a plan view of the staircase of FIG. 1 in the deployed position as seen from directly behind the truck with a user walking up the staircase.

Connected between the two rails of the frame 102 are five steps 101. The length of the frame 102 and the number of steps 101 may vary depending on the width of the truck 105 and the height of the truck bed 106. The length of the frame 102 is generally selected so that when the staircase 100 is in a stowed position, as discussed below, the staircase 100 fully fits inside the truck 105 and is fully above the bed 106 (i.e. all portions of the staircase 100 are directly above some portion of the truck bed 106). The number of steps 101 is generally selected so that the height differential between successive steps 101 is a comfortable distance for a typical user 300 to ascend and descend, such as about one foot, as depicted in FIG. 3. The depth of the steps 101 (left to right relative to the truck in the deployed position) may be selected to avoid the overlap of steps 101 while providing sufficient depth for supporting a user's feet. The width of the steps 101 and spacing between the rails of the frame 102 may be any distance sufficient for a user to walk up and down the staircase 100, such as three feet. Each step 101 is attached directly to the frame 102 rails at the proximal side (the right side as shown in the figures) and is supported by two supporting members 108 at the distal side (the left side as shown in the figures), one member 108 being connected to each of the two rails so that each step 101 is approximately parallel to the truck bed 106 and ground 119 in the deployed position.

An advantage of the staircase design is that it requires much less clearance behind the truck 105 that does a staircase or ramp extending directly rearward from the rear end 107 of the truck 105. All parts of the staircase are within a distance approximately equal to, or slightly greater than, the width of the steps 101 from the notional truck rear end plane, which may be, for example, less than one meter. In general, the distance is about equal to the width of the steps (or the distance between the front and rear rails perpendicular to the rear end 107 of the truck bed 106) plus the amount of clearance between the front side of the steps or front rail and the notional vertical plane though the rear end 107 of the truck 105.

The staircase 101 may have a foldable railing 103 as depicted in the figures. This is preferred but is not essential, and low cost embodiments may not include a railing. The depicted railing 103 comprises a number of segments pivotably attached to each other at points 113, 114, 115 and 120, with the lower distal portions pivotably connected to the feet 111 of the staircase 100 and the lower proximal portions pivotably connected to the shelf 104 or to the bed connector, discussed below, that connects the shelf 101 to the bed 106. In the deployed position shown in FIG. 1, the railing may be maintained in place by a removable pin that is inserted into joint 114 in combination with two proximal straps 110 and two distal straps 109 that prevent the railing segments they attach to from moving past the proximal and distal ends of the staircase 100 in the deployed position.

Figure 2:
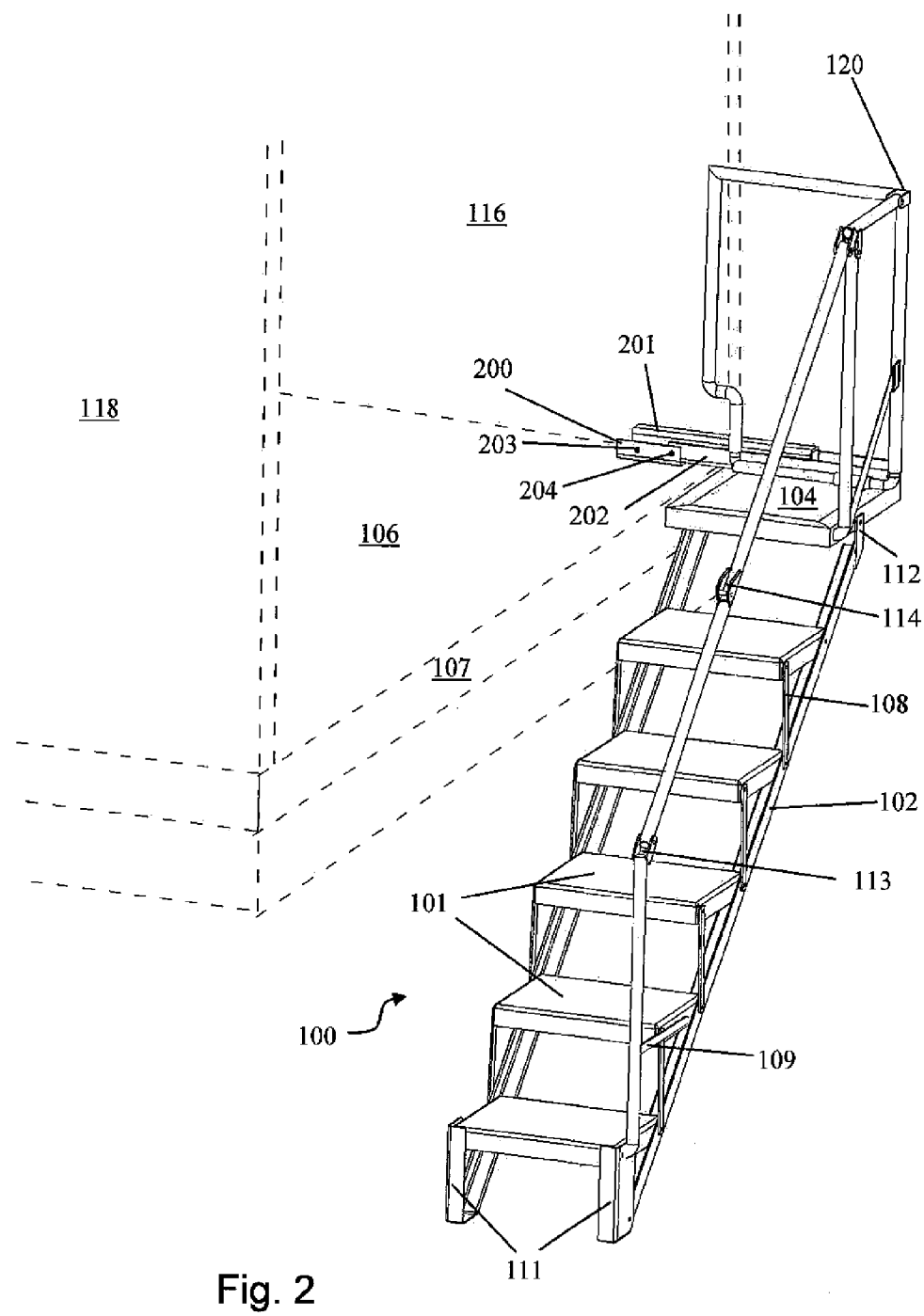
FIG. 2 is a perspective view of the staircase of FIG. 1 in the deployed position as seen from the left side of the truck.
Figure 7:
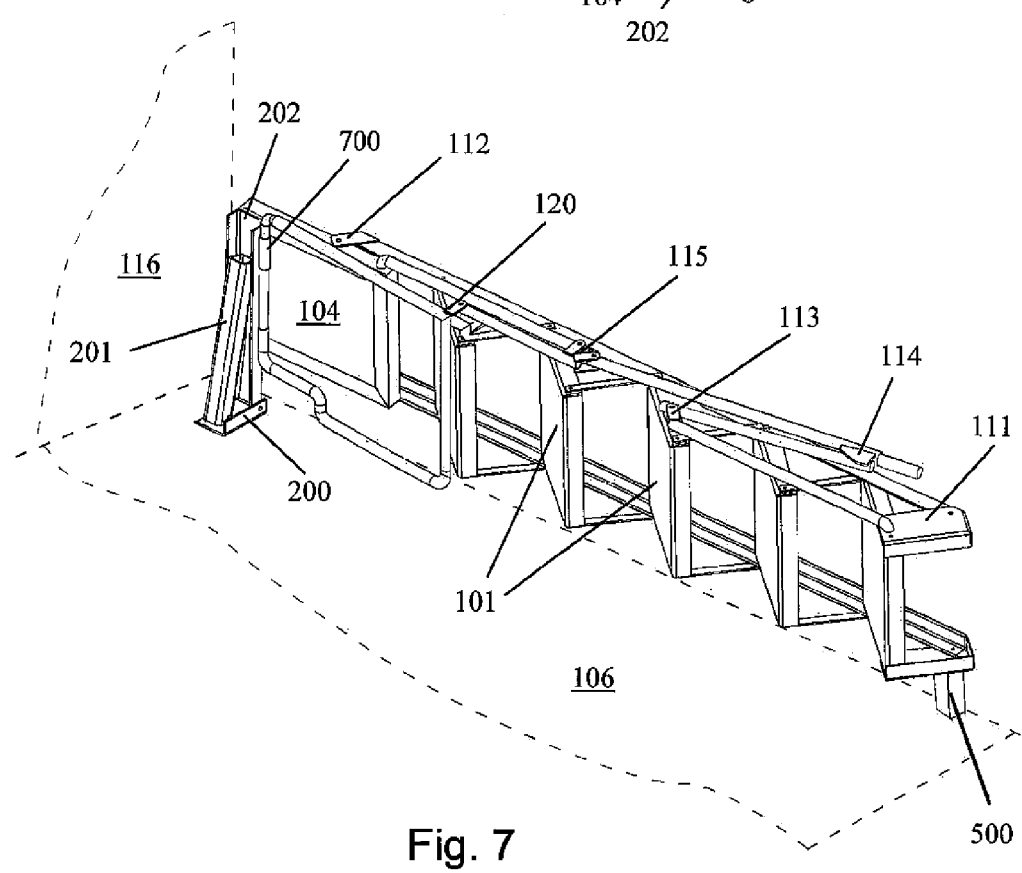
FIG. 7 is a perspective view of the staircase of FIG. 1 in the first stowed position as seen from the left interior side of the truck with the railings fully folded.
Figure 8:
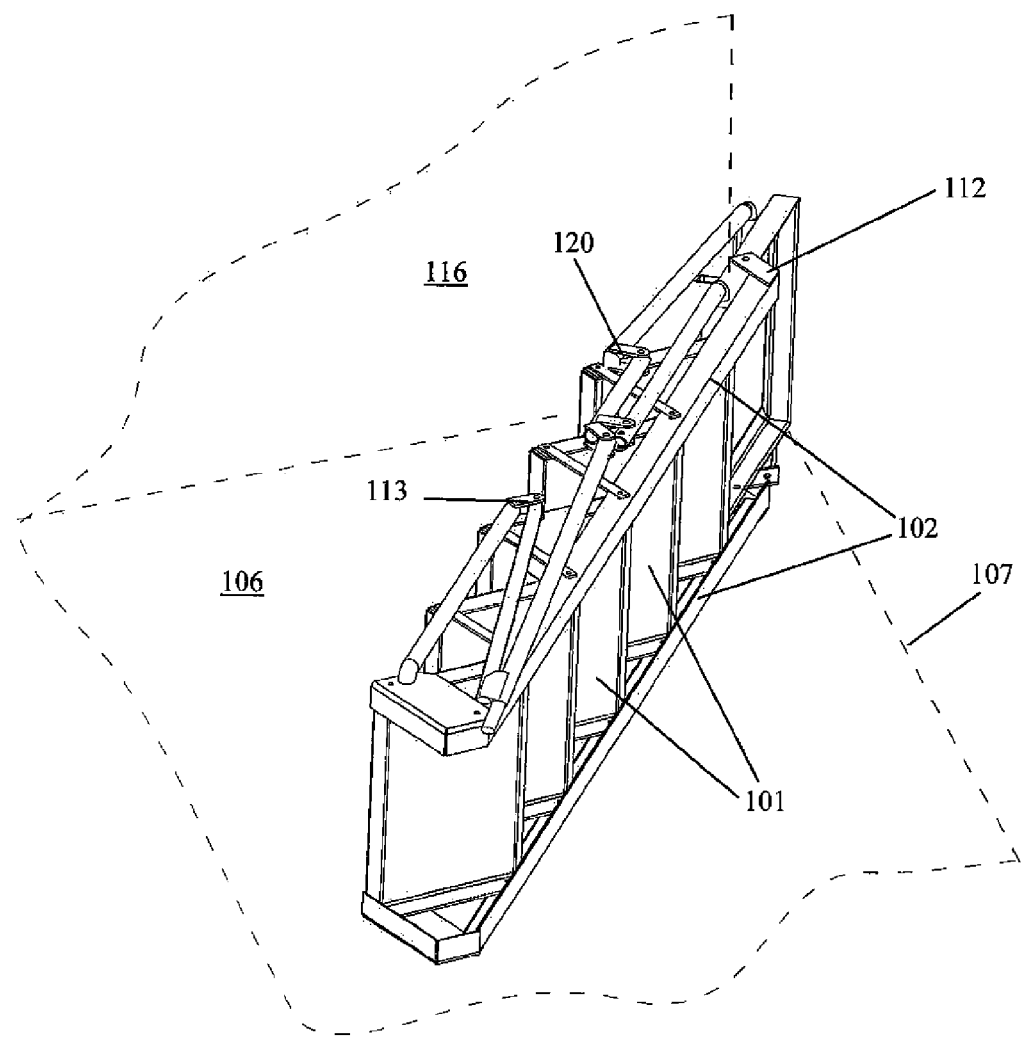
FIG. 8 is a perspective view of the staircase of FIG. 1 with the railings fully folded in a position intermediate between the first stowed position and a second stowed position as seen from the left interior side of the truck.
Figure 9:
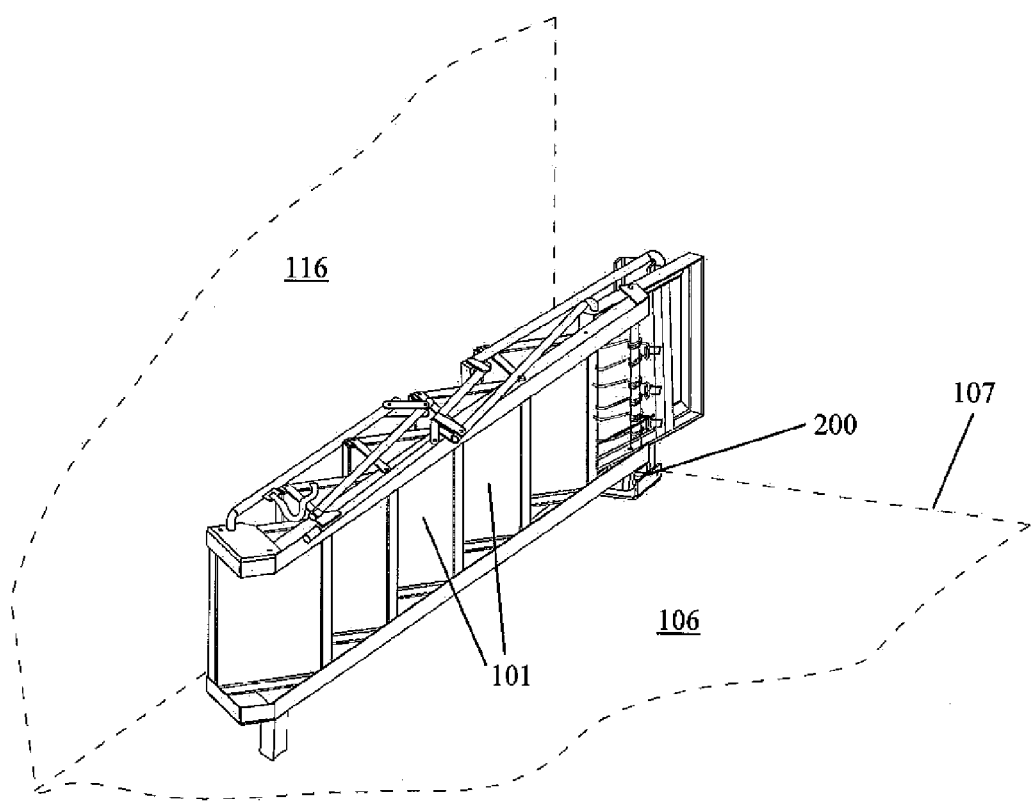
FIG. 9 is a perspective view of the staircase of FIG. 1 with the railings fully folded in the second stowed position parallel to the right interior wall of the truck, with all portions of the staircase frame proximate to the wall, as seen from the left interior side of the truck.

FIG. 2 further shows the connector mounting plate 200 that is rigidly connected to the truck bed 106 to which the bed connector pivotably connects. The front arm 201 of the bed connector is pivotably connected to a front or central point 203 of the connector mounting plate 200. The rear arm 202 of the bed connector is pivotably connected to a rear portion of the mounting plate 200 at point 204. This allows the bed connector to rotate from being parallel to the bed 106 extending outward (rearward) from the rear end 107 of the truck 105 in the deployed position, as shown in FIG. 2, into a stowed position, as best seen in FIG. 7, in which the rear arm 202 of the bed connector is substantially perpendicular to the bed 106, while the front arm 201 rises at a steep angle from the front or middle of the connector mounting plate 200 to an upper portion of the rear arm 202. As can be seen in FIG. 7, the rear arm 202 defines a channel and the rear end of the front arm 201 is constrained to travel back and forth within the channel but is constrained so that it cannot travel up the channel past the point where the rear arm 202 is substantially perpendicular to the bed 106. In simpler embodiments, the front arm 201 is not required, however it is preferred that the rear arm 202 is still constrained to only rotate between the deployed position in which it is parallel to the truck bed 106 and the stowed position in which it is substantially perpendicular to the bed 106. Various known mechanisms may be employed to so constrain the movement of the rear arm 202 to prevent the rear arm 202 from moving past the perpendicular position. The rear arm 202 is constrained by the truck bed 106 from going past the point that it is parallel to the truck bed 106 in the deployed position because a portion of the rear arm 202 (generally indicated as item 400 in FIG. 4) lies on the truck bed 106 when the bed connector is in the deployed position.

Figure 4:
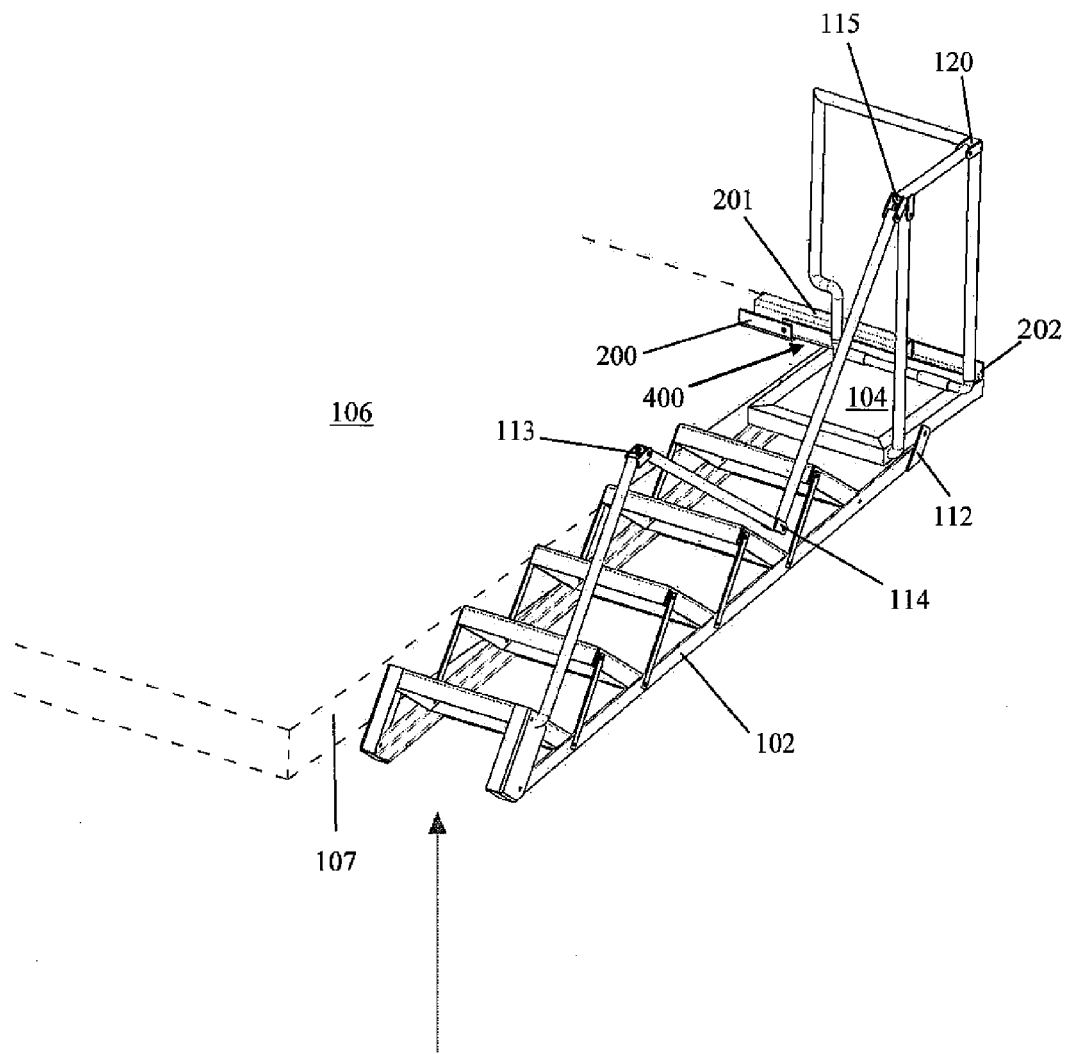
FIG. 4 is a perspective view of the staircase of FIG. 1 in a position intermediate between the deployed position and a first stowed position with the railings partially folded.
Figure 5:
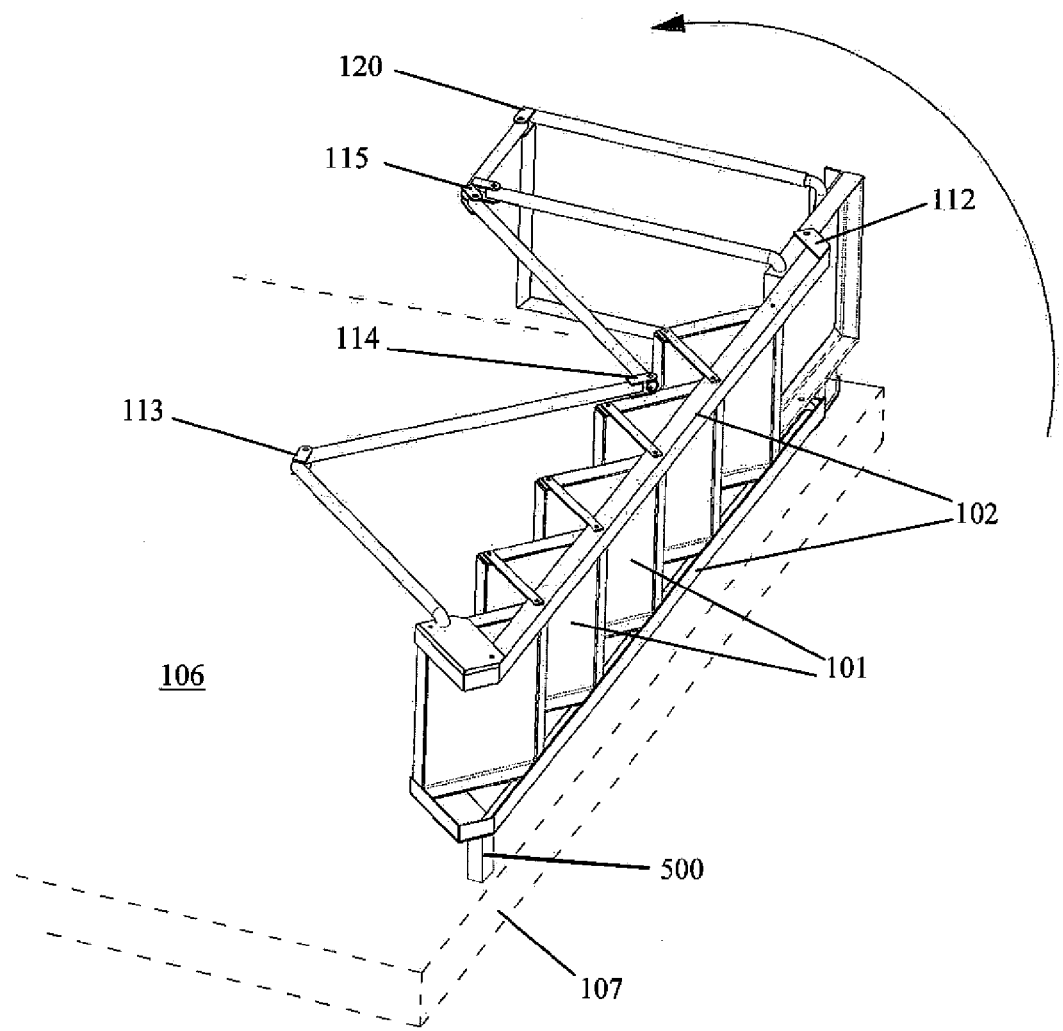
FIG. 5 is a perspective view of the staircase of FIG. 1 in the first stowed position with the railings partially folded.
Figure 6:
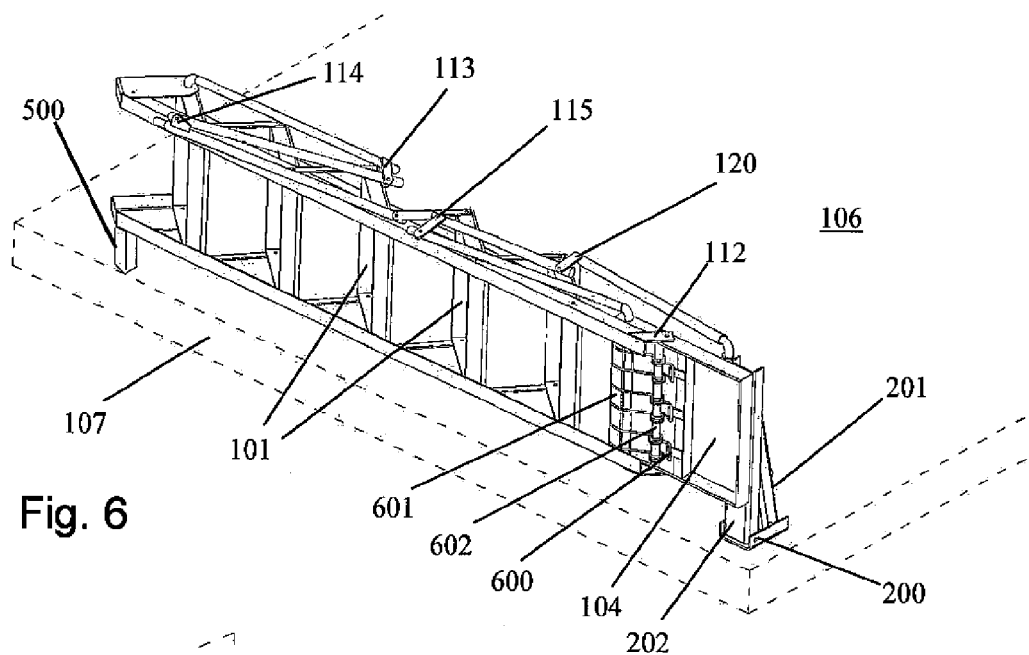
FIG. 6 is a perspective view of the staircase of FIG. 1 in the first stowed position as seen from the right rear of the truck with the railings fully folded.

As can be seen in FIGS. 2 and 4, the rear end of the connector mounting plate 200 and the base of the rear arm 202 (where it connects to the connector mounting plate 200) are spaced apart from the rear end 107 of the truck bed 106. This spacing results in a portion of the rear arm 202 at the location generally indicated as item 400 in FIG. 4, lying on the truck bed 106 when the bed connector is in the deployed position and maintaining the bed connector in a position parallel to the truck bed 106, but it also means that the front rail of the frame 102 is spaced apart from and above the truck bed 106 when the staircase is in a stowed position. As a result, it is preferable to have a lateral foot 500 as shown in FIG. 5 that has a length comparable to, or slightly greater than, the spacing between the connection point of the rear arm 202 and the connector mounting plate 200 and the front portion of the shelf/frame, the lateral foot 500 being disposed on the front side of the frame near the distal end. The lateral foot 500 then abuts the truck bed 106 when the staircase 100 is in a stowed position (as seen in FIGS. 5-7) and facilitates the frame 102 remaining parallel to the truck bed 106 to prevent any undesirable stress on the frame 103 or bed connector while the staircase 100 is in a stowed position.

The pivotable attachment of the frame 102 to the shelf 104 by the frame connectors 112 permits a user to rotate the frame upward from the deployed position into a retracted position, as shown in FIG. 4, where the frame 102 (i.e. the rails of the frame) is parallel to the shelf 104 and truck bed 106. In order to do this, the pin in the railing at joint 114 may first be removed to allow the railing to fold as shown in FIG. 4, although this is not required if the user does not wish to fold the railing. After being moved to the retracted position of FIG. 4, the staircase 100 can then be rotated as a whole to the first stowed position shown in FIG. 5 where all portions of the staircase 100 are above the truck bed 106, and the staircase frame 102 and steps 101 are substantially perpendicular to the vehicle bed 106. In this position, and in other stowed positions, the rear door of the truck may be closed if desired, for example before moving the truck. As the staircase 100 is rotated into the first stowed position, the front and rear arms 201, 202 of the bed connector rotate about the connector mounting plate 200 until the rear arm 202 is perpendicular to the bed 106, as best seen in FIG. 7.

The railing may then be fully folded by rotating its components about the pivot points to arrive at the fully folded position shown in FIGS. 6-9. In this position, all portions of the railing are near to the staircase frame 102. For example, no portion of the railing may be more than 50 centimeters from the staircase frame 102. Alternatively, particularly if there are items on the truck bed 106 near the rear end 107, the railing may be fully folded prior to rotating the staircase 100 into the first stowed position.

The shelf 104 is rotatably connected to the rear arm 202 by connectors 700, but is constrained so that it cannot rotate so that its distal end goes below the bed 106 when the staircase 100 is in the deployed position in order to provide strong support for a user stepping on the shelf. The proximal end of the shelf 104 is directly connected to the bed connector which is constrained not to go beyond the point that the shelf is parallel to the truck bed 106. The connectors 700 are configured to only permit the shelf to rotate to the position in which the shelf 104 is parallel to the truck bed 106 when the bed connector is in the deployed position. This constraint also ensures that the shelf 104 is maintained completely above the truck bed 106 when the rear arm 202 is in the stowed position perpendicular to the truck bed 106.

It may be desirable or necessary to leave the staircase 100 in the first deployed position when moving the truck 105 if the truck bed 106 near the staircase 100 has objects sitting on it. However, it is preferred that the staircase 100 be configured to allow rotation of the staircase to a second stowed position. In this case, when the rear arm 202 is in the stowed position perpendicular to the truck bed 106 the shelf 104 (and the frame 102 and steps 101) can be rotated about the rear arm 202 towards the front of the truck 105 and into the interior of the truck 105 so that the staircase 100 can be rotated from the first stowed position shown in FIG. 7, through the intermediate position shown in FIG. 8 to the second stowed position shown in FIG. 9, in which the frame 102 is substantially parallel to the inner wall 116 of the truck 105, and all portions of the frame 102 are proximate to the inner wall 116. The process can be reversed so that the staircase 100 is moved from the second stowed position shown in FIG. 9, through the intermediate position shown in FIG. 8 to the first stowed position shown in FIG. 7, where the staircase 100, via the bed connector, can then be rotated about the connector mounting plate 200 to the position shown in FIG. 4, and then the frame 102 can be rotated about the shelf 104 into the deployed position of FIGS. 1-3.

In some embodiments, which are not preferred, the shelf may be rigidly attached to the bed connector so that it cannot rotate at all. In such embodiments, the only available stowed position is the first stowed position. However, in all embodiments, the shelf (or in embodiments where the frame or a ramp directly connects to the bed connector, the frame or ramp) may be designed to be detachable from the bed connector so that the user can lift the shelf, frame and steps off the connector and carry them to a desired storage location.

In order to facilitate rotating the frame 102 from the deployed position into the retracted position of FIG. 4, and help to maintain it in a stowed position, one or more springs 600 may be attached to the shelf 104, such as to a bar 602 under the flat surface of the shelf 104 near the shelf connectors 112, so that the springs 600 bias the frame 102 upward when the staircase 100 is in the deployed position, for example by pressing against a frame cross-slat 601 extending between the two rails near the shelf connectors 112 so that the shelf connectors 112 are located between the proximal and distal ends of the springs 600. The springs are selected so that they do not cause the frame 104 and steps 101 to move upward when the staircase is in the deployed position in the absence of any weight on the steps 101 or frame 102. By applying such bias, much less force is required by the user to rotate the frame upward from the deployed position to the retracted position of FIG. 4 so that it is easier to stow the staircase.

In a second embodiment (not shown in the figures), the staircase may be configured with no shelf. In this case, the frame rails pivotably connect directly to the bed connector so that the frame and steps can be rotated from the deployed position to a retracted position like that shown in FIG. 4. In other respects the second embodiment is similar to the first embodiment, so that the frame and steps can be rotated along with the bed connector from a retracted position like that shown in FIG. 4 to a first stowed position like that shown in FIGS. 5-7. The frame and steps may then be further rotated from the first stowed position though intermediate positions like that shown in FIG. 8 to a second stowed position like that shown in FIG. 9 where the staircase is substantially perpendicular to an interior wall 116 of the truck 105. Note that if one considers the shelf of the first embodiment described above to be a part of an extended bed connector, then the second embodiment is very similar to the first except that the bed connector is then more complex in the first embodiment.

In a third embodiment, rather than discrete steps, the staircase, which may be better referred to as a retractable entry system, may employ a ramp. Like the second embodiment, the proximal end of the ramp is rotatably connected to the bed connector so that it can be rotated exactly like the other embodiments between a deployed position and stowed positions. The ramp may be a typical flat ramp, although it is preferred than the proximal portion of the ramp be configured so that an extended portion, such as two feet, abuts and is parallel to the rear end of the bed at the same height as the bed, when the staircase is deployed.

It should be understood that the above-described embodiments of the present invention, particularly, any "preferred" embodiments, are only examples of implementations, merely set forth for a clear understanding of the principles of the invention. Many variations and modifications may be made to the above-described embodiment(s) of the invention as will be evident to those skilled in the art.

Where, in this document, a list of one or more items is prefaced by the expression "such as" or "including", is followed by the abbreviation "etc.", or is prefaced or followed by the expression "for example", or "e.g.", this is done to expressly convey and emphasize that the list is not exhaustive, irrespective of the length of the list. The absence of such an expression, or another similar expression, is in no way intended to imply that a list is exhaustive. Unless otherwise expressly stated or clearly implied, such lists shall be read to include all comparable or equivalent variations of the listed item(s), and alternatives to the item(s), in the list that a skilled person would understand would be suitable for the purpose that the one or more items are listed.

Where, in this document, including the claims, the conjunction "or" is used in a list, such as in "w is done by performing x, performing y or by performing z", unless otherwise clearly implied, the "or" is non-exclusive. In this example, w may therefore be done by performing all of x, y and z, performing any two of x, y and z, or performing any one of x, y and z, unless the simultaneous performance is not possible or does not make sense.

The words "comprises" and "comprising", when used in this specification and the claims, are to used to specify the presence of stated features, elements, integers, steps or components, and do not preclude, nor imply the necessity for, the presence or addition of one or more other features, elements, integers, steps, components or groups thereof.

The scope of the claims that follow is not limited by the embodiments set forth in the description. The claims should be given the broadest purposive construction consistent with the description as a whole.

What is claimed is:

1. A staircase for a vehicle having two sides and a flat bed having a rear end, the staircase comprising:
   (a) a rigid staircase frame having proximal and distal ends;
   (b) a rigid bed connector having an arm that is attached to the staircase frame near the proximal end of the staircase frame, the bed connector being pivotably attachable to the vehicle bed so that the bed connector is rotatable between a stowed position in which all portions of the bed connector are above the vehicle bed and a deployed position in which the arm of the bed connector extends outward from the rear end of the vehicle bed, the staircase frame being rotatably attached to the bed connector arm so that when the bed connector is in the deployed position the staircase frame is rotatable between a deployed position in which the distal end of the staircase frame rests on the ground and a retracted position in which the staircase frame is substantially parallel to the vehicle bed, and wherein, when the staircase frame is in the retracted position and the bed connector is in the deployed position, and the bed connector is then rotated to the stowed position while the position of the staircase frame relative to the bed connector is held fixed, the staircase is then in a first stowed position in which all portions of the staircase are above the vehicle bed; and (c) a plurality of steps attached to the staircase frame so that when the bed connector and staircase frame are in the deployed position, the steps are substantially parallel to the ground and a user can walk up the stairs and onto the vehicle bed, wherein when the bed connector and staircase frame are each in the deployed position, each of the steps is approximately the same distance from a notional vertical plane passing through the rear end of the vehicle bed.

2. The staircase of claim 1, wherein the bed connector is attached to the vehicle bed near one side of the vehicle, and no portion of the staircase extends beyond either side of the vehicle when the bed connector and staircase frame are each in the deployed position or in a stowed position.

3. The staircase of claim 1, wherein when the bed connector is in the deployed position, no portion of the staircase is more than one meter behind the notional vertical plane passing through the rear end of the vehicle bed.

4. The staircase of claim 1, wherein when the staircase is in the first stowed position, the staircase frame and steps are substantially perpendicular to the vehicle bed.

5. The staircase of claim 4, wherein the bed connector is attached to the Vehicle bed near one side of the vehicle, and when the bed connector is in the stowed position, the staircase frame is rotatable about the bed connector between the first stowed position and a second stowed position in which all portions of the staircase frame are proximate to one of the inner sides of the vehicle.

6. The staircase of claim 1, further comprising a railing attached to the staircase frame.

7. The staircase of claim 6, wherein the railing is movable between a deployed position and a stowed position so that when the staircase is in the first stowed position, and the railing is in the stowed position, no portion of the railing is more than 50 centimeters from the staircase frame.

8. The staircase of claim 6, wherein when the bed connector, staircase frame and railing are each in the deployed position, the railing is lockable in the deployed position.

9. A staircase for a vehicle having a flat bed having a rear end, the staircase comprising:

(a) a rigid shelf having a substantially flat upper surface;

(b) a bed connector having an arm attached to the shelf for pivotable attachment to the vehicle bed so that the bed connector arm and shelf are rotatable between a deployed position in which the shelf and bed connector arm extend out from the rear end of the vehicle bed so that the flat upper surface of the shelf is substantially parallel to the vehicle bed, and a stowed position in which all portions of the shelf and bed connector are above the vehicle bed;

(c) a rigid staircase frame pivotably attached to the shelf and rotatable between a retracted position, in which the staircase frame is above the vehicle bed when the shelf is in the stowed position, and a deployed position such that when the bed connector arm, shelf and staircase frame are each in the deployed position an end of the staircase frame rests on the ground; and (d) a plurality of steps attached to the staircase frame so that when the bed connector arm, shelf and staircase frame are each in the deployed position, the steps are substantially parallel to the ground and a user can walk up the stairs onto the shelf and onto the vehicle bed, wherein when the bed connector arm, shelf and staircase frame are each in the deployed position, each of the steps is approximately the same distance from a notional vertical plane passing through the rear end of the vehicle bed.

10. The staircase of claim 9, wherein when the shelf is in the deployed position, the flat upper surface of the shelf is at substantially the same height as the rear end of the vehicle bed and the shelf abuts the rear end of the vehicle bed.

11. The staircase of claim 9, wherein when the bed connector arm, shelf and staircase frame are each in the deployed position no portion of the staircase is more than one meter away from the rear end of the vehicle bed.

12. The staircase of claim 9, wherein when the staircase frame is in the retracted position the staircase frame is substantially parallel to the shelf.

13. The staircase of claim 12, wherein when the bed connector arm, shelf and staircase frame are each in the stowed position the shelf and staircase frame are substantially perpendicular to the vehicle bed.

14. The staircase of claim 13, wherein the bed connector is attached to the vehicle bed near one side of the vehicle, and when the bed connector arm, shelf and staircase frame are each in the stowed position, the shelf and staircase frame are rotatable about the bed connector so that the shelf and staircase frame may be rotated between a position in which the shelf and staircase frame are substantially parallel to the rear end of the vehicle bed, and a position in which the shelf and all portions of staircase frame are proximate to an inner side of the vehicle.

15. The staircase of claim 9, further comprising a railing attached to outer portions of the shelf and staircase frame.

16. The staircase of claim 15, wherein the railing is movable between a deployed position and a stowed position so that when the bed connector arm, shelf and staircase frame are each in the stowed position, and the railing is in the stowed position, no portion of the railing is more than 50 centimeters from the staircase frame.

17. The staircase of claim 15, wherein when the bed connector arm, shelf, staircase frame and railing are each in the deployed position, the railing is lockable in the deployed position.

* * * * *